United States Patent
Cherubini et al.

(10) Patent No.: US 11,403,514 B2
(45) Date of Patent: Aug. 2, 2022

(54) CORRELATIVE TIME CODING METHOD FOR SPIKING NEURAL NETWORKS

(71) Applicant: International Business Machines Corporation, Armonk, NY (US)

(72) Inventors: Giovanni Cherubini, Rueschlikon (CH); Ana Stanojevic, Zurich (CH); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 15/931,514

(22) Filed: May 13, 2020

(65) Prior Publication Data

US 2021/0357725 A1   Nov. 18, 2021

(51) Int. Cl.
*G06N 3/04*      (2006.01)
*G06N 3/08*      (2006.01)

(52) U.S. Cl.
CPC ............ *G06N 3/049* (2013.01); *G06N 3/084* (2013.01)

(58) Field of Classification Search
CPC ...... G06N 3/049; G06N 3/0472; G06N 3/084; G06N 3/088
See application file for complete search history.

(56) References Cited

U.S. PATENT DOCUMENTS

| | | | |
|---|---|---|---|
| 9,373,038 B2 | 6/2016 | Richert | |
| 2015/0095274 A1* | 4/2015 | Lamb | G06F 7/584 |
| | | | 708/250 |
| 2016/0210552 A1 | 7/2016 | Kasabov | |
| 2018/0225562 A1* | 8/2018 | van der Made | G06N 3/063 |
| 2019/0057301 A1 | 2/2019 | Pantazi | |

OTHER PUBLICATIONS

"Car Evaluation Data Set", UCI Machine Learning Repository, last printed May 13, 2020, 3 pages, <https://archive.ics.uci.edu/ml/datasets/Car+Evaluation>.

"Lecture 4—Principles of Neural Coding", StudyBlue flashcards, © 2018, Neuroscience 210 with Bolduc at University of Alberta, 3 pages.

Almomani, et al., "A comparative study on spiking neural network encoding schema: Implemented with cloud computing", Cluster Computing, Jun. 2019, 21 pages, <https://www.researchgate.net/publication/330433606_A_comparative_study_on_spiking_neural_network_encoding_schema_implemented_with_cloud_computing>.

(Continued)

*Primary Examiner* — Sung S Ahn
(74) *Attorney, Agent, or Firm* — Edward P. Li (57) ABSTRACT

A computer-implemented method for classification of an input element to an output class in a spiking neural network may be provided. The method comprises receiving an input data set comprising a plurality of elements, identifying a set of features and corresponding feature values for each element of the input data set, and associating each feature to a subset of spiking neurons of a set of input spiking neurons of the spiking neural network. Furthermore, the method comprises also generating, by the input spiking neurons, spikes at pseudo-random time instants depending on a value of the feature for a given input element, and classifying an element into a class depending on a distance measure value between output spiking patterns at output spiking neurons of the spiking neural network and a predefined target pattern related to the class.

20 Claims, 7 Drawing Sheets

(56) References Cited

OTHER PUBLICATIONS

Bohte, et al., "Error-backpropagation in temporally encoded networks of spiking neurons", Neurocomputing 48 (2002), pp. 17-37.

Diehl, et al., "Unsupervised learning of digit recognition using spike-timing-dependent plasticity", Frontiers in Computational Neuroscience, published: Aug. 3, 2015, vol. 9, Article 99, 9 pages.

Gardner, et al., "Encoding Spike Patterns in Multilayer Spiking Neural Networks", arXiv:1503.09129v1 [cs.NE] Mar. 31, 2015, pp. 1-31.

Kasinski, et al., "Comparison of Supervised Learning Methods for Spike Time Coding in Spiking Neural Networks", Int. J. Appl. Math. Comput. Sci., 2006, vol. 16, No. 1, pp. 101-113, <http://citeseerx.ist.psu.edu/viewdoc/download?doi=10.1.1.104.7329&rep=rep1&type=pdf>.

Litke, Alan, "What is the neural code?", UCSD, SlidePlayer, last printed May 13, 2020, 40 pages, <https://slideplayer.com/slide/8622119/>.

Ponulak, et al., "Introduction to spiking neural networks: Information processing, learning and applications", Acta Neurobiol Exp 2011, 71: 409-433.

Stanojevic, Ana, "File Classification Based on Spiking Neural Networks", Master's Thesis, École polytechnique fédédrale de Lausanne, Oct. 31, 2019, 21 pages, Evidence of Grace Period Use or Sale.

Venkatesan, et al., "Graph-based data relevance estimation for large storage systems", 2018 IEEE International Congress on Big Data, pp. 232-236.

Yu, et al., "A brain-inspired spiking neural network model with temporal encoding and learning", Neurocomputing, vol. 138, Aug. 22, 2014, pp. 3-13, <https://www.sciencedirect.com/science/article/pii/S0925231214003452>.

* cited by examiner

CORRELATIVE TIME CODING METHOD FOR SPIKING NEURAL NETWORKS

BACKGROUND

The invention relates generally to a spiking neural network, and more specifically, to a computer-implemented method for classification of an input element to an output class in a spiking neural network. The invention relates further to a spiking neural network for a classification of an input element to an output class in the spiking neural network, and a computer program product.

Artificial intelligence (AI) continues to be a hot topic in scientific research, as well as in application areas and with this also for enterprise and consumer computing. Many advances have been made using an artificial neural network (ANN), e.g., in the form of a convolutional neural network (CNN) or a spiking neural network (SNN). Typically, the basis for all of these networks is neural encoding which is the study of how neurons would present information by electrical signals (action potentials) at the level of individual cells or in networks of neurons. Information encoding methods are preferable which enable the very fast information processing of the brain.

To this purpose, rate encoding of spike patterns generated by neurons in a spiking neural network (SNN) has been a dominant paradigm for a few years. However, many operations are needed to allow the reliable estimation of neural firing rates. At least in some neural systems, the efficient processing of information is more likely to be based on the precise timing of action potentials. Temporal encoding schemes have also been proposed. For example, input patterns are presented to the input-layer neurons of an SNN where, for a given input, each input neuron generates an independent Poisson spike train with a predetermined mean firing rate. A relatively large number of patterns can be encoded and learned by the SNN. For classification tasks, unsupervised learning based on spike-timing-dependent plasticity (STDP) or supervised learning by backpropagation through time, where the error is obtained by comparing the spike patterns at the output neurons with target input patterns corresponding to the output classes, may be considered. However, by encoding each element in an input data set with an independent pattern, only the information on small data sets, having cardinality of the order of about 100 elements can be reliably learned by the network.

In contrast to this, typical data sets used in artificial intelligence are much larger. Furthermore, in typical data sets, input elements may be correlated. This aspect has not yet been addressed by this solution proposed as part of prior art schemes.

SUMMARY

In one aspect, a computer-implemented method for a classification of an input element to an output class in the spiking neural network is provided. The computer-implemented method comprises receiving an input data set comprising a plurality of elements, identifying a set of features and corresponding feature values for each element of the input data set, and associating each feature to a subset of spiking neurons of a set of input spiking neurons of the spiking neural network. The computer-implemented method further comprises generating, by the input spiking neurons, spikes at pseudo-random time instants depending on a value of a feature for a given input element. The computer-implemented method further comprises classifying an element into a class depending on a distance measure value between output spiking patterns at output spiking neurons of the spiking neural network and a predefined target pattern related to the class.

In another aspect, a spiking neural network for a classification of an input element to an output class in the spiking neural network is provided. The spiking neural network comprises: a receiving module for receiving an input data set comprising a plurality of elements; an identification module for identifying a set of features and corresponding feature values for each element of the input data set; an association module for associating each feature to a subset of spiking neurons of a set of input spiking neurons of the spiking neural network; a generator module for generating, by the input spiking neurons, spikes at pseudo-random time instants depending on a value of a feature for a given input element; and a classification module for classifying an element into a class depending on a distance measure value between output spiking patterns at output spiking neurons of the spiking neural network and a predefined target pattern related to the class.

In yet another aspect, a computer program product for a spiking neural network for a classification of an input element to an output class in the spiking neural network is provided. The computer program product comprising a computer readable storage medium having program instructions embodied therewith. The program instructions are executable by one or more computing systems or controllers to cause the one or more computing systems to: receive an input data set comprising a plurality of elements; identify a set of features and corresponding feature values for each element of the input data set; associate each feature to a subset of spiking neurons of a set of input spiking neurons of the spiking neural network; generate, by the input spiking neurons, spikes at pseudo-random time instants depending on a value of a feature for a given input element; and classify an element into a class depending on a distance measure value between output spiking patterns at output spiking neurons of the spiking neural network and a predefined target pattern related to the class.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Embodiments of the invention will be described, by way of example only, and with reference to the following drawings.

DETAILED DESCRIPTION

In the context of this description, the following conventions, terms and/or expressions may be used.

The term "spiking neural network" or SNN may denote a special sort of artificial neural networks that more closely mimic natural neural networks. In addition to neuronal and synaptic states, the SNN incorporates the notion of time into their operating model. The basic concept is that artificial neurons in the SNN do not fire at each propagation cycle (as it happens with typical multi-layer perceptron networks), but rather fire a spike only when a membrane potential—an intrinsic quality of the neuron related to its membrane electrical charge—reaches a predefined value. When a neuron fires, it generates a signal that travels to other neurons which, in turn, increase or decrease their potentials in accordance with this signal. In the context of the spiking neural network (SNN), the current activation level (e.g., modeled as a differential equation) is normally considered to be the neuron's state, with incoming spikes pushing this value higher, eventually either firing or decaying. Various coding methods exist for interpreting the outgoing signal pattern—i.e., the spike train—as a real-value number, relying on either the frequency of spikes, or an interval between spikes, to encode information.

The term "classification" may denote here, in the context of machine learning, that a system may receive unknown data (e.g., a text file, a digital image, a digital sound bite, etc.) which the system may associate to one of a predefined number of classes with a respective probability value. In case of supervised learning, the system may have been trained before with known data and knows the classes. In case of unsupervised learning, the system may build clusters for the data of an unknown data set and may classify the input data into a predefined number of classes.

The term "training" may denote a process of teaching a neural network of any kind how to predict an output based on given input data. During this process, parameters of the artificial neuron for signal processing and signal transmission are tuned in order to step-by-step improving the prediction results. Typically, data with known prediction results (labels or other kind of metadata) are fed to an input layer of the neural network. Via backpropagation of signals from an output layer to previous layers within the network, the parameters and thus the behavior of the neurons are optimized, e.g., a local function minimum is step-wise reached.

The term "backpropagation" may denote, in particular in machine learning, an algorithm for training feedforward neural networks for supervised learning. In deep learning, the backpropagation computes the gradient of the loss function with respect to the weights (i.e., parameters of artificial neurons) of the network for a single input/output example and does so efficiently, unlike a naive direct computation of the gradient with respect to each weight individually. This efficiency makes it feasible to use gradient methods for training multilayer networks, updating weights to minimize loss; gradient descent, or variants such as stochastic gradient descent, is commonly used. The backpropagation algorithm may work by computing the gradient of the loss function with respect to each weight by the chain rule, computing the gradient one layer at a time, iterating backward from the last layer to avoid redundant calculations of intermediate terms in the chain rule.

The term "input data set" may denote here a set of nearly any type of digital data, like a text file, a digital image, a video sequence, a digital sound file, etc. The input data may also be a result of a measurement by sensors, e.g. seismic data, weather data (temperature, humidity, wind speed, cloud level, dust level, radioactivity, and so on).

The term "element" may denote an entity of the input data set. Each element may have associated one or more values relating to predefined features of the element. For example, a car may have a price, e.g., very-high, high, medium, low; a maintenance price, very-high, high, medium, low; number of doors, e.g., 2, 3, 4, 5; and so on.

The term "subset of spiking neurons" may denote a group of input neurons having a smaller number of neurons than the total number of neurons of the input layer of the spiking neural network.

The term "input spiking neurons" may denote those artificial neurons being part of the input layer of the spiking neural network.

The term "spikes" may denote signals generated by the artificial neurons depending on a stimulus. The kind and the sequence of spikes generated may depend on the encoding method chosen. Typically, the spike signal value may be a fixed value, e.g., a predefined voltage level. The spikes may be generated at a predetermined frequency or time distance.

The term "distance measure" may denote a method to determine a difference between two expressions. The distance function may be denoted as metric. It represents an important aspect of machine learning and artificial intelligence. A plurality of distance metrics is known. One metric that may be important in the context of the here proposed concept is the van Rossum metric. It measures the distance between two spike trains. Measuring a single van Rossum distance between one pair of spike trains is not a computationally expensive task.

The term "output spiking pattern" may denote a sequence of signals generated at an output of an artificial spiking neuron.

The term "output spiking neuron" may denote an artificial neuron of a spiking neural network being a part of the output layer of the spiking neural network. The spiking neural network may comprise at least two layers: the input layer and the output layer. They may be connected in an all-to-all fashion (or alternatively, only selected neurons may be connected to each other). Furthermore, one or more fully or partially connected hidden layers, in particular positioned between the input layer and the output layer, may be present in the spiking neural network.

The term "target pattern" may denote a predefined spike train or a sequence of spikes pre-associated to one of the target classes of the spiking neural network performing the task of a classification.

The proposed computer-implemented method for classification of an input element to an output class in a spiking neural network may offer multiple advantages, contributions and technical effects.

Compared to other kinds of neural networks often requiring a large number of hidden layers, the here proposed spiking neural network may be much more energy efficient. This is because the high number of matrix compute-intensive multiplications and the intra-neuronal propagation of signals typically required in other machine learning systems may require comparably much more energy. Also, the relatively smaller number of layers of the here proposed spiking neural network and the proposed encoding reduce the energy consumption significantly.

Moreover, the spike-timing-dependent plasticity (STDP) used as part of the here proposed concept can be seen as an advantage. It adheres to a biologically plausible rule that allows efficient learning. Additionally, an implementation of the concept proposed here can comparably easily be reached using a memristor matrix with only a few additional components like subtraction circuits, analogue/digital converters and leaky-integrate-and-fire (LIF) circuits.

Furthermore, potentially the most important advantage may be the fact that not only about 200, or a few 100, different spike patterns may be classified, but hundreds of thousands or millions of different spike patterns. One of the reasons may be on the usage of the correlative temporal encoding scheme used.

Furthermore, the here proposed concept may also work if dependencies may exist between elements (i.e., their features). Known spiking neural networks have a significant problem addressing this.

Furthermore, the proposed concept may be applied to SNNs where unsupervised learning is achieved by STDP, which allows adaptability to time varying system parameters.

Additional embodiments, applicable to the method as well as to the related system, will be described as follows.

According to one embodiment of the method, a type of a feature may be selected out of the group comprising at least a categorical type, examples may be "male"/"female"; an ordinal type, examples may be "small", "medium", "large"; and a numerical type. For the last type, one may also consider alphanumeric types, for which an example may be a name of a person. In case of real values (in the mathematical sense) a form of binning may be used.

According to an embodiment of the method, the spiking neural network may comprise at least one hidden layer of spiking neurons connected between the input layer and the output layer of the spiking neural network for supervised learning. Skilled persons may remind such a design of typical neural networks of the non-spiking class in which typically a large number of hidden layers may be used. However, it is not always required that a hidden layer is present in the spiking neural network for the here proposed concept. In many cases, the fundamental concept may also work with only an input layer of artificial spiking neural nodes and a directly connected output layer of artificial spiking neural nodes.

According to one embodiment, the method may also comprise, naturally during a learning phase, performing training of the spiking neural network by a back-propagation of an error signal through time. Thereby, the error signal may be obtained by comparing a generated spike pattern at an output of output spiking neurons with a predefined target output pattern relating to a class of an element. In such a configuration, the here proposed concept may be configured for supervised learning.

According to another embodiment of the method, the spiking neural network may comprise an input layer of spiking neurons connected to an output layer. It may be noted that in this configuration not any hidden layers between the input layer and the output layer of spiking neurons may be required. Such a configuration may be best suited for unsupervised learning.

According to a further embodiment of the method, the associating each feature to a subset of spiking neurons may comprise associating one feature/value pair to one of the subset of spiking neurons. Each subset of input neurons may be exactly one a small plurality of input neuron(s). This embodiment may be a further developed embodiment discussed in the preceding paragraph. It may also be well suited to unsupervised learning.

According to an embodiment, the method may also comprise connecting the spiking neurons of the output layer with all-to-all inhibitory connections. This may mean that, when a spike happens in one of the output neurons, it will inhibit the spiking of all other output neurons in order to help neurons designate for only one class. As a result, only excitatory connections causing the spiking of that one neuron will be strengthened using the STDP learning rule. This essentially leverages what is called the winner-take-all (WTA) principle. This may be applied in this embodiment again for the unsupervised learning case. However, the principle may also be known from supervised learning configurations.

In addition to the WTA principle, in case of supervised learning, one may also add a so-called teacher signal. The signal may be essentially sending additional spikes to output neurons that are predestinated for the class corresponding to the current input. This will make those output neurons spike with a higher rate, while excitatory connections causing the spiking will be strengthened using the STDP learning rule.

Hence, also a simple neural network with one layer can be trained using STDP. In case of unsupervised learning, one should use the WTA principle to designate output neurons for a certain case. In the supervised case, one should use a teacher signal, while inhibitory connections can be used to improve performance.

According to a further embodiment, the method may also comprise, in particular again for the case of unsupervised learning, categorizing classes of the elements by relating a class with one class-labelled element (or alternatively, a few class-labeled elements). With this, the proposed spiking neural network concept may be well suited to be used as a classifier.

According to another embodiment, the method may also comprise, in particular again for the case of unsupervised learning, performing training of the spiking neural network by a winner-take-all approach, as already mentioned above, in more detail and in a larger context.

According to a further enhanced embodiment method, a correlation between the pseudo-random input spike patterns may correspond to a similarity value between the elements of the input data set. Principally in contrast to existing solutions, this may also have the advantage that dependencies between data in the input data set may be reflected by the proposed concept.

In following paragraphs, a detailed description of the figures will be given. All instructions in the figures are schematic. Firstly, a block diagram of an embodiment of the inventive computer-implemented method for classification of an input element to an output class in a spiking neural network is given. Afterwards, further embodiments, as well as embodiments of the spiking neural network for a classification of an input element to an output class in the spiking neural network, will be described.

Figure 1:
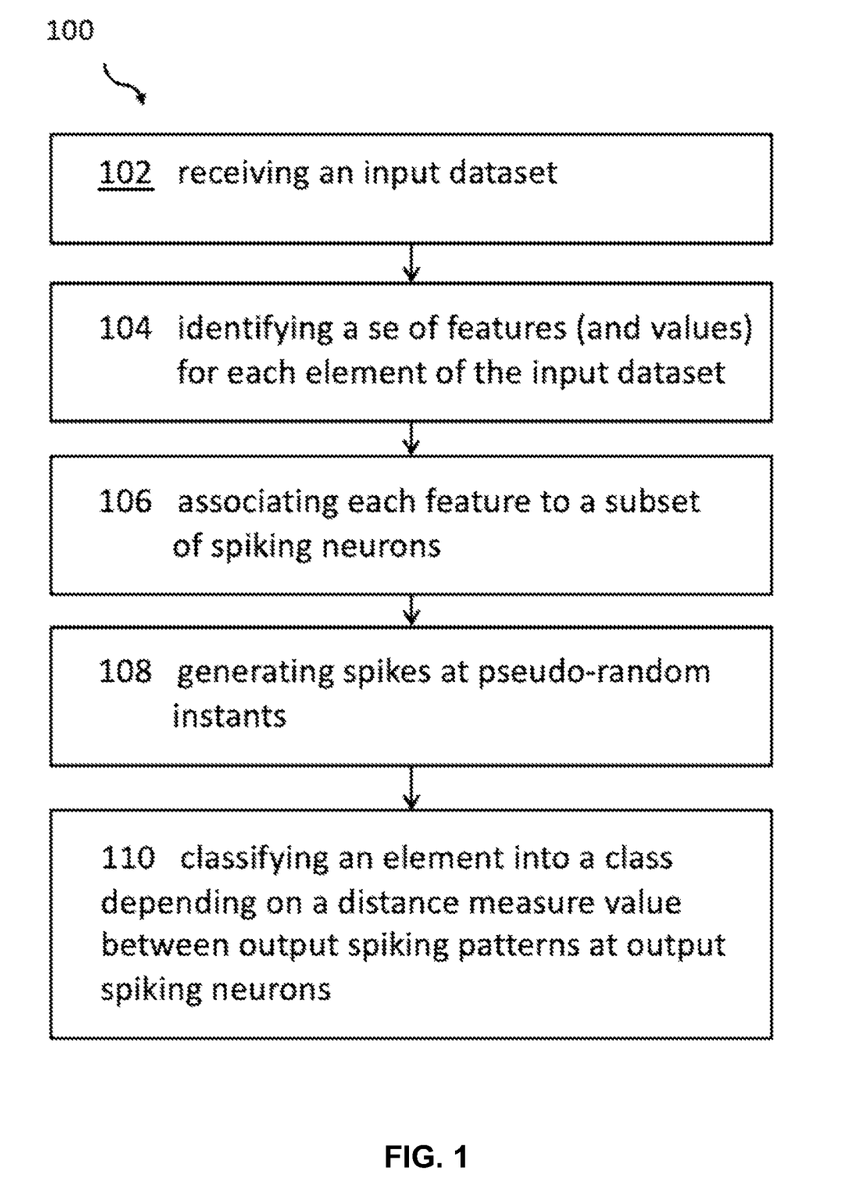
FIG. 1 is a flowchart showing a computer-implemented method for classification of an input element to an output class in a spiking neural network, in accordance with one embodiment of the present invention.

FIG. 1 is a flowchart showing a computer-implemented method for classification of an input element to an output class in a spiking neural network, in accordance with one embodiment of the present invention. As minimal implementation, the spiking neural network may only have an input layer of artificial neurons and a directly connected output layer of artificial neurons. The method 100 comprises receiving, at step 102, an input data set comprising a plurality of elements, e.g., text files, images, sound files, or similar.

The method 100 further comprises identifying, at step 104, a set of features known as keys (such as metadata of the element) and corresponding feature values for each element of the input data set, i.e., each element relates to a plurality of features, and each feature may relate to a plurality of values. A more detailed example will be given below.

The method 100 further comprises associating, at step 106, each feature to a subset of spiking neurons of a set of input spiking neurons of the spiking neural network. At this stage a difference between an implementation for supervised learning and unsupervised learning may be made. For the supervised learning case, all input spiking neurons of a subset are associated with an input pattern. In contrast, for the unsupervised learning, a direct relationship between a feature/value pair and at least one specific input spiking neuron shall be provided.

The method 100 comprises generating, at step 108, by the input spiking neurons, spikes at pseudo-random time instants depending on a value of the feature for a given input element. Each feature/value pair relates always to identically reproducible spike patterns.

The method 100 further comprises classifying, at step 110, an element into a class (such as out of a group of classes) depending on a distance measure value between output spiking patterns at output spiking neurons of the spiking neural network and a predefined target pattern related to the class.

Figure 2A:
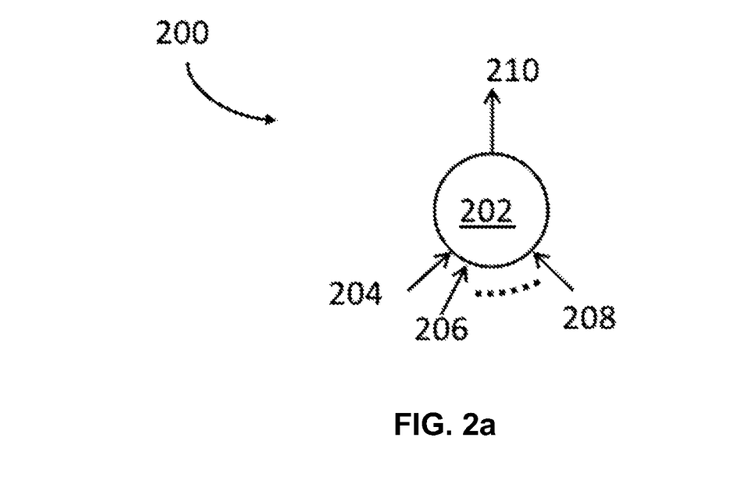
FIG. 2a shows a block diagram of a theoretical neuron, in accordance with one embodiment of the present invention.

FIG. 2a shows a block diagram 200 of a theoretical neuron 202. The neuron 202 receives a plurality of spike patterns of spike trains 204, 206, and 208. It may be understood that synapses exist over the inter-neuronal connections indicated by the arrows touching the neuron 202. Based on the received spike patterns, an output signal 210 is generated.

Figure 2B:
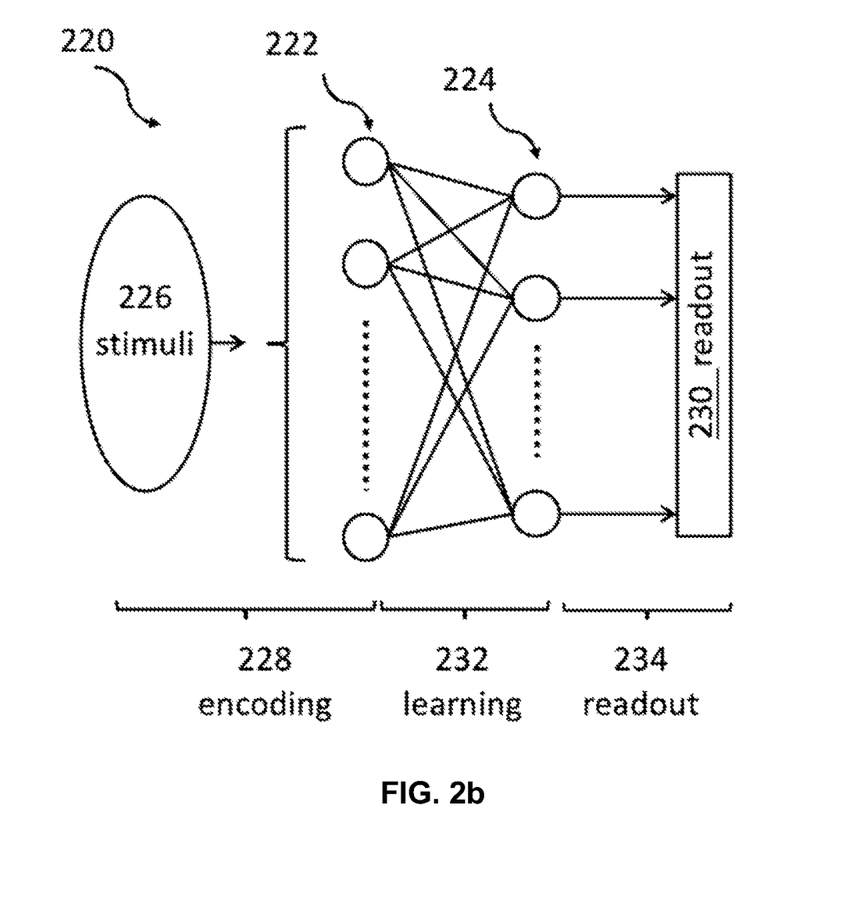
FIG. 2b shows a block diagram of a theoretical neuron, in accordance with one embodiment of the present invention.

FIG. 2b shows a block diagram of a simple spiking neural network 220. The spiking neural network 220 comprises at least an input layer 222 of artificial spiking neurons and an output layer 224 of artificial spiking neurons. The example of FIG. 2b shows a fully connected spiking neural network 220. Based on the stimuli 226 which need to be mapped into spike patterns by a proper encoding 228 by the encoding neurons of the input layer 222, the learning neurons of the output layer 224 generate the readout 230. This sequence is also shown in 3 phases: encoding 228, learning 232, readout 234. Nevertheless, one of the main problems posed to spiking neural networks is the conversion of input signals (i.e., the stimuli) to spike patterns or spike trains which is also known as "encoding". The here proposed inventive concept is mainly focused on this encoding phase.

Figure 3A:
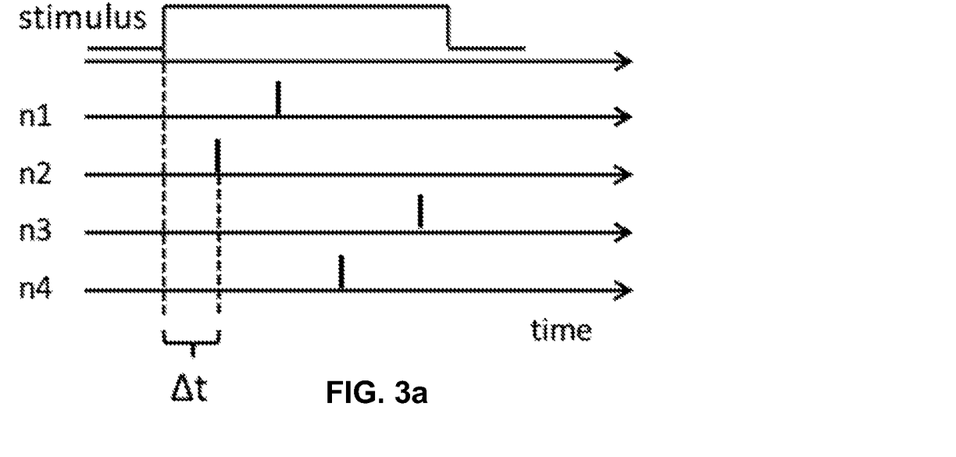
FIG. 3a, FIG. 3b, and FIG. 3c show examples of coding options for spiking neural networks, in accordance with one embodiment of the present invention.
Figure 3B:
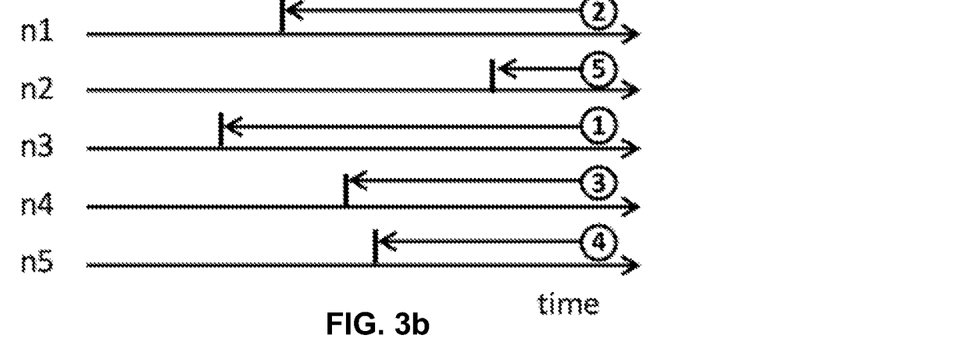
Figure 3C:
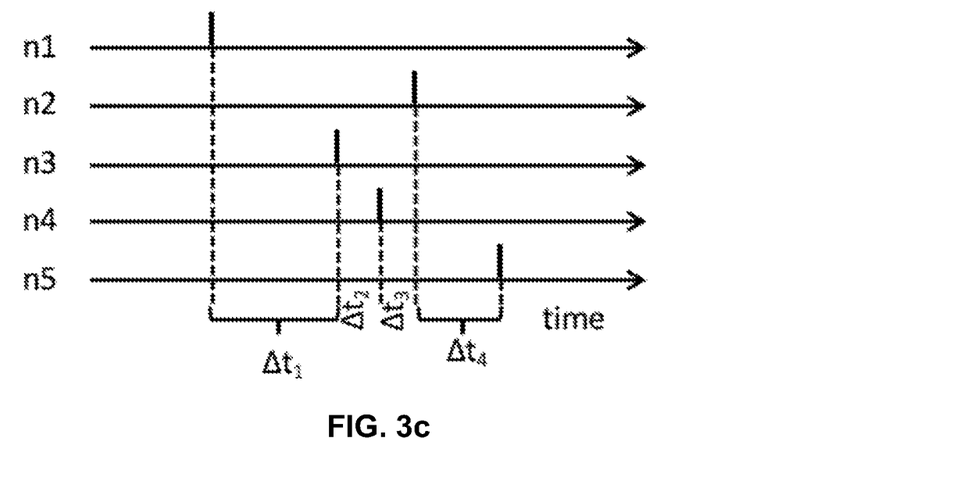

For completeness reasons, FIG. 3a, FIG. 3b, and FIG. 3c show examples of coding options, in particular those for temporal and sparse coding, for spiking neural networks. FIG. 3a shows an example of a "time to first spike". Neuron n2 shows the shortest Δt between the beginning of the stimulus and the generated spike of neuron n2. The other neurons n1, n3, n4 generate their spikes at a later point in time.

FIG. 3b shows an example of a rank coding. In this case, the ranks are indicated by the numbers in the circles. For example, neuron n3 got associated the first rank.

FIG. 3c shows an example of a latency coding based on exact timing of spikes. In this case, the different $\Delta t_i$ play a predominant role in the correct interpretation of the spike trains.

In general, when using large input data sets, the encoding of the input becomes a critical factor. When independently encoding the respective input variables, each dimension is encoded by an array of one-dimensional receptive fields. In the case of an implementation with sparse coding, one may represent continuously valued input variables by a population of neurons with grated and overlapping Gaussian activation functions (the receptive fields). For each input pattern, response values of the neurons, encoding the respective variables, have to be determined, yielding n (number of neurons)*m (number of variables) values between 0 and 1. The obtained values are then converted to delay times.

The spiking neural networks can use a fully temporal encoding scheme to encode input information. Membrane potentials at time t of a postsynaptic neuron, o, that receives input from presynaptic neurons, h, can be determined, as described by "Encoding Spike Patterns in Multilayer Spiking Neural Networks", Brian Gardner, Ioana Sporea, André Gruending, 2015. There, one may find also a log-likelihood of a sequence of output spikes given target output spikes for an output neuron besides an output layer weight update rule, as well as a hidden layer weight update rule.

However, experience shows that in a network with 100 input layer neurons, in which each input neuron generates an independent Poisson spike train with a mean firing rate (e.g., 6 Hz,) of a relatively large number of patterns can be encoded and learned by the spiking neural network.

On the other side, there are also a series of shortcomings. By encoding each element in an input data set with an independent pattern, only the information on small data sets can be reliably learned by the network. Gardner at al. (see above) have only shown an acceptable classification performance for up to 200 input patterns and 10 classes. However, typical datasets are much larger (may comprise and/or require thousands of input elements) and, in a typical dataset, input elements may be correlated. This situation is very difficult to handle for the example shown and shortly discussed implementation options as of today.

Figure 4:
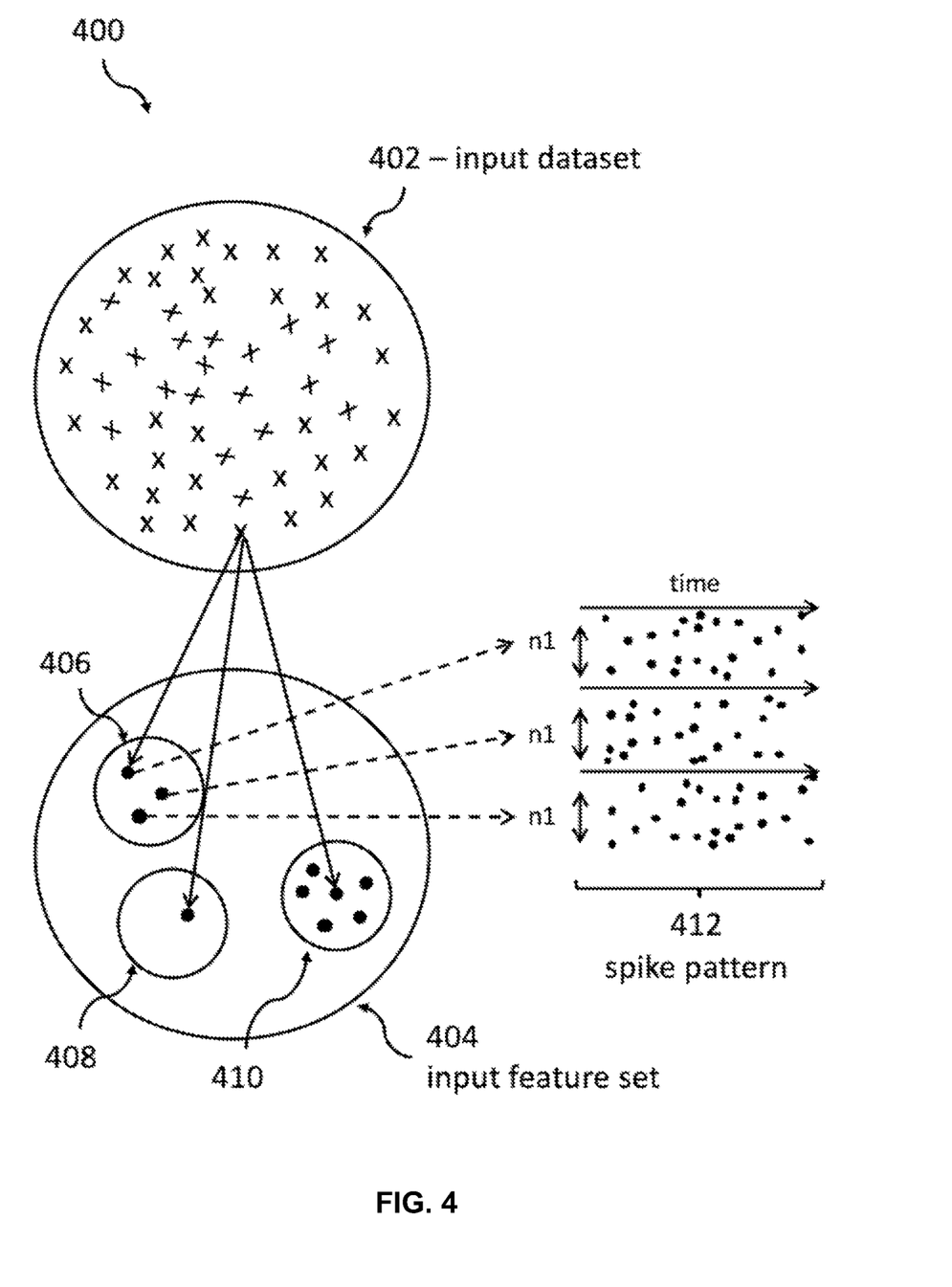
FIG. 4 shows an example of encoding for a correlative time coding scheme, in accordance with one embodiment of the present invention.

FIG. 4 shows a block diagram of an embodiment 400 for a current collective time encoding scheme. Generally, for a given element from an input data set, there is a related set of features, also denotable as keys, and corresponding values are identified. Thereby, each feature is associated with a subset or plurality of input spiking neurons that generate spikes at pseudo-random time instants depending on the value that the feature assumes for the given input element. The input spiking neurons are permanently fixed, associated with or related to a particular feature across the input elements. And, a pseudo-random spike pattern is permanently mapped to a particular feature/value pair across the input elements.

The correlation between the pseudo-random generated spike patterns for two feature/value pairs may correspond to a similarity value between elements that exhibit the feature/value pairs in the input data. The underlying task of the spiking neural network can be seen as to classify the given input element to an output class, in particular to a discrete unique value of an output class.

Thereby, two learning approaches can be considered. (A) Learning may be performed by back-propagation through time, where the error is obtained by comparing the spike patterns at the output neurons with target output patterns corresponding to the elements of the output class. (B) Alternatively, an unsupervised (winner-take-all, WTA) learning using spike-timing-dependent plasticity may be considered.

In detail, FIG. 4 shows a diagram 400 of an embodiment for data classification. The input data set 402 comprising a plurality of elements builds the starting point. Each of the elements (which are shown as crosses in the input dataset 402) relates to a set of key/value pairs of the input feature set 404 (i.e., as available features and respective feature values). In the input feature set 404, 3 keys 406, 408, and 410 are shown. Thereby, key 1/value 1 of the 406 key 1 is related to the neuron group n1 with a specific spike pattern 412, value 2 of key 1 is related to the same neuron group n1, but with a different spike pattern 412, value 3 of key 1 is related to again the same neuron group n1 but with a further different pattern 412. Neurons' groups n3 and n2 for the other keys 410 and 408, respectively, are not shown in this figure.

In general, the encoding of a key/value pair for a given key is achieved by mapping the key/value to a predetermined spike pattern (of a set of input neurons of the spiking neural network associated with the key), wherein the spikes of the pattern occur at pseudo-randomly generated time instants. Thereby, the correlation between the pseudo-randomly generated spike patterns for two key/value pairs may correspond to a similarity value between the elements with the two key/value pairs. Then, the learning is done by backpropagation through time, wherein the error is obtained by comparing the spike patterns at the output neurons with target output patterns corresponding to classes.

Figure 5:
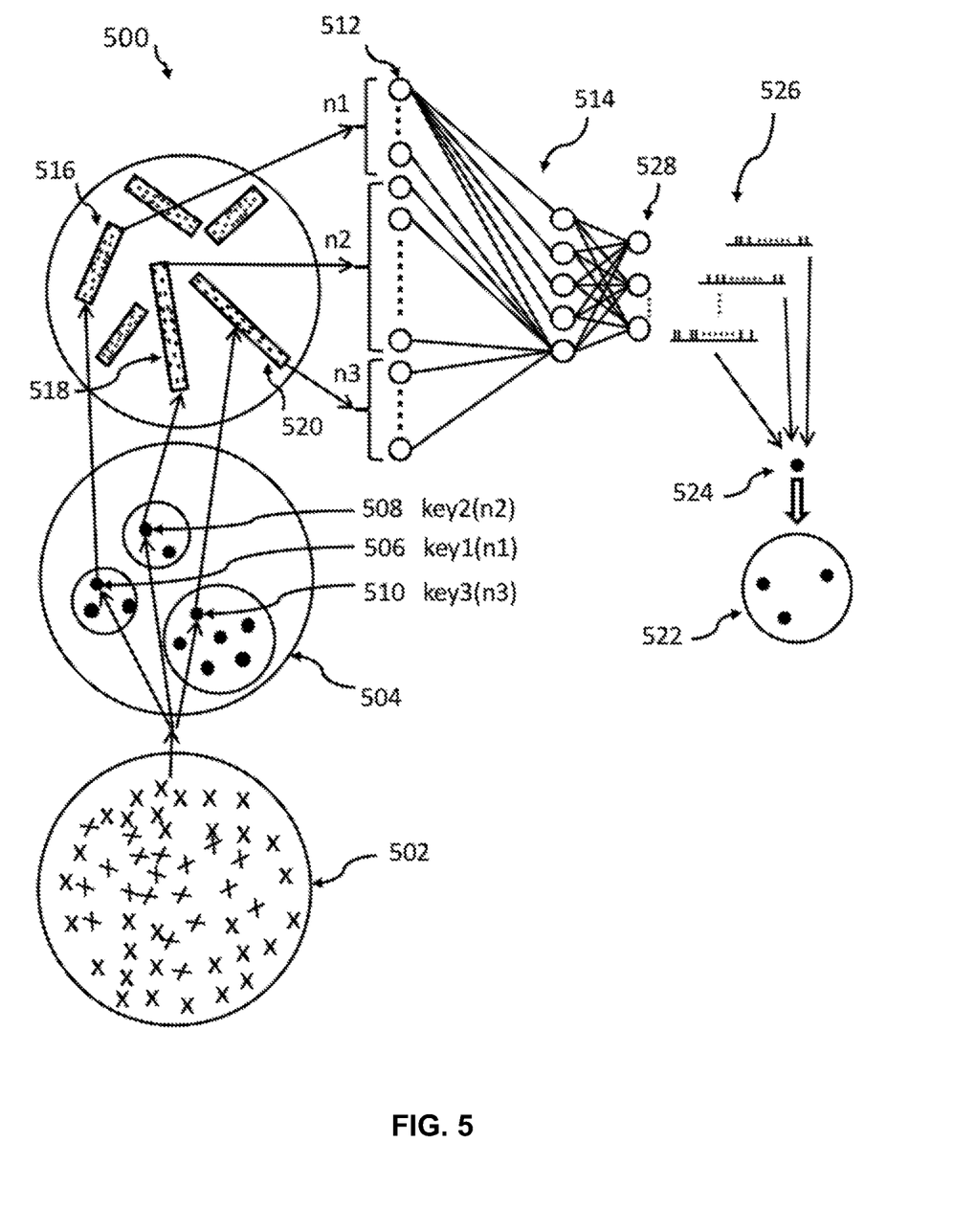
FIG. 5 illustrates an example of a complete architecture of a proposed file classification system based on a spiking neural network (SNN), in accordance with one embodiment of the present invention.

FIG. 5 shows a complete architecture 500 of an example of a proposed file classification system based on SNNs. The file may be a text file, an image file or any other file comprising at least semi-structured data.

Each element (symbolized as a cross, each cross shall have a different content) of the input file set 502 is described with K feature values $[f_1, f_2, \ldots, f_K]$ which are also referred to as key/value pairs and from a set 504. The objective is to classify each file from the input file set 502 to one of M classes from a set 522, $C=\{c_1, c_2, \ldots, c_M\}$. In general, each feature can be either categorical or numerical, whereas classes are discrete and do not imply an order. The classification task comprises inferring the class of an element/cross from input file set 502 given its feature values, as designated in 504.

Each circle in the set 504 comprises values and each element of the input file set 502 can have for a given feature. Thus, each circle inside the set 504 relates to a feature. For example, three key/value pairs 506, 508, and 510 are shown as key1(n1), key2(n2), key3(n3).

Each of these possible key/value pairs are assigned a unique pseudo-random spike pattern and each key is associated with a subset of the input neurons 512 (on the top input neuron of the spiking neural network 514 has a reference numeral, here 512). In the given example, three sub-groups of input neurons are named: n1, n2, n3. The input neurons 512 generate spikes at pseudo-random time instants, depending on the value the related key assumes for a given input file. The fixed pseudo-random patterns 516, 518, and 520 are associated with the key/value pairs 506, 508, and 510, as indicated by the linking arrows. Thus, for example, the key/value pair key1(n1) is associated via the fixed pseudo-random patterns 516 to the input group n1 of neurons 512 of the spiking neural network 514.

This way, it can be achieved to encode input files from the set 504 into input spike patterns 516, 518, and 520 and to decode output spike patterns of the spiking neural network 514 into classes 522. The information from each input file (i.e., one of the crosses of 502) is encoded into the precise timing of action potential (temporal encoding). The spiking neural network 514 produces output spike patterns. In case of the output of the SNN is rate encoded, the class is predicted from the neuron that spikes with highest rate. In case of a time encoded output, for each class a target output pattern is predetermined. For inference, the class is predicted from the target spike pattern which is closest to the output spike pattern using, e.g., the van Rossum distance metric.

It has been shown that with temporal encoding and where every neuron independently generates spikes as a random Poisson process, it is possible to reliably classify around 200 spike patterns with 10 output classes. When generating by temporal encoding input spike patterns, one would like to translate similarities among the input files into the correlation of input spike patterns. Under the assumption that similar input files are often sharing the same one or more key/value pairs, the proposed encoding should facilitate the learning task for a neural network and result in improved classification accuracy for input data sets that are larger than a few hundred files. Input file sets with much more than just a few hundred files are far more realistic than the environment with at most around 200 elements discussed above. Therefore, the proposed encoding is a novel correlated temporal encoding (CTE) scheme with the following characteristics:

For a given input file, keys (features) and corresponding values are identified;

Each key is associated with a set of input neurons of the SNN; those neurons generate spikes at pseudo-random time instants, depending on the value the key assumes for the given input file; and The input spiking neurons are fixed for a given key and pseudo-random spike patterns are fixed for a given key/value pair.

Thus, in CTE same key/value pairs imply the same spike patterns. Therefore, any similarity among input files due to the same key/value pairs is translated into the correlation (inner product) between input spike patterns.

A relative plastic example may be given by two pictures of a building or statue (e.g., the Eiffel Tower). One taken during the day with a bright blue sky background, and a second comparable one taken during the night where most of the picture is dark (the foreground, the sides, the sky) and only the Eiffel tower itself is visible through its illumination. The result of the above-described architecture and method is that the activation of the input neurons is mostly identical for the two pictures, i.e., the content of the two input files.

It may also be noted that the output neurons 528 generate different spike trains 526 which may undergo a WTA (winner-take-all) function 524. This function or module selects the class of the classes 526 with the highest firing rate. The number of neurons 528 and the corresponding spike trains 526 (i.e., signal patterns) and the number of classes 522 should preferably be the same. Additionally, it may be mentioned that the SNN is typically fully connected; however, for illustration reasons, only a few connections are shown in FIG. 5.

For the learning of the SNN according to the above-discussed architecture, three learning algorithms may be considered in conjunction with CTE to train the file classifier SNN.

One is the STDP (spike timing-dependent plasticity) learning rule. Alternatively, two variants of the backpropagation algorithm, one probabilistic and one deterministic may be used. For STDP the leaky-integrate-and-fire (LIF) neuron model and rate encoded output is assumed. In contrast, back propagation algorithms rely on time encoded target spike patterns.

Probabilistic backpropagation assumes a spike response neuron model (SRM) which can be seen as a generalization of the LIF model. A neuron fires with probability $$\rho(u) = \frac{1}{(1 + e^{-\beta u})}$$

given membrane potential u and parameter β. The membrane potential at time instant t of a postsynaptic neuron j that receives input signals from presynaptic neurons n is:

$$u_j(t) = \Sigma_n w_{jn}(Y_n * \varepsilon)(t) + (Z_j * \kappa)(t)$$

where $w_{jn}$ is the synaptic weight between neurons n and j, $(Y_n * \varepsilon)(t)$ and $(Z_j * \kappa)(t)$ denote convolution between a spike sequence and a postsynaptic potential (PSP) kernel ε and reset kernel κ, respectively, and where a spike sequence of a postsynaptic neuron n is given by a sequence of delta functions, $Y_n(t) = \Sigma_f \delta(t - t^f_n)$, and where $\{t^f_n\}$ denotes the sequence of time instants at which the neuron fires. During the training process, the log-likelihood of output patterns given target output spike patterns from the SNN is maximized. Deterministic backpropagation is known, wherein the neuron behavior is described by two discrete-time equations:

$$s_t = g(Wx_t + 1(\tau) \odot s_{t-1} \odot (1 - y_{t-1}))$$

$$y_t = h(s_t + b)$$

where $x_t$ is the input, $s_t$ is the vector of internal state variables and $y_t$ is the output vector. Furthermore, W is a synaptic weight matrix, $l(\tau)$ is a leaky parameter, g and h are activation functions, b is a bias implementing the spiking threshold and ⊙ denotes the element-wise product. It can be shown that such spiking neural unit (SNU) is mimicking the behavior of the LIF model. During the training at each time step t the binary cross-entropy loss between the neuron output and the target signal representing the desired class is minimized.

In experiments and to investigate system performance and possible trade-offs with complexity of implementation, the following CTE-based SNN models and learning techniques have been tested:
  System 1: one-layer SNN with unsupervised or supervised STDP learning;
  System 2: one and two-layer SNNs, with probabilistic backpropagation;
  System 3: multi-layer SNNs, with deterministic backpropagation.

As a result, it turned out that the high efficiency of the unsupervised or supervised STDP in system 1 may justify a trade-off performance compared to the backpropagation-based algorithms. Moreover, the classification accuracy achieved, even via unsupervised learning is high enough to assume adequate suitability for large scale classifier systems based on SNNs.

For system 2, the performance of the 2-layer model is significantly better than a one-layer model, even though the derivation of the weight update involves larger approximations. System 3 shows the best accuracy overall. This is thanks to the update rule obtained by the adopted backpropagation through time, which does not require the approximations of the probabilistic approach. The results obtained by system 3 are close to, or even surpassing, logistic regressions and non-linear support-vector machine (SVM) performance. Hence, the ability to obtain high accuracy for data sets with tens of thousands of elements was only possible owing to the introduction of the CTE scheme.

In one embodiment, a prototype was built for the neural conductivity using a memristive crossbar array with about 10,000 PCM (phase-change memory) devices.

An example may illustrate the fundamental concept. The starting point may be a data classification of a car acceptability data set. The classification labels, i.e., the output or result of the spiking neural network, may relate to the car acceptability: unacceptable, acceptable, good, and very good.

Additionally, six features may be used: buying price, maintenance price, number of doors, capacity in terms of persons, size of luggage boot, and estimated safety of the car. In total 21 feature/value pairs may be considered.

TABLE 1

| Feature | Value |
| --- | --- |
| buying price | very-high, high, medium, low |
| maintenance price | very-high, high, medium, low |
| number of doors | 2, 3, 4, 5 |
| capacity in terms of persons | 2, 4, more |
| size of luggage boot | small, medium, big |
| estimated safety of the car | low, medium, high |

The features may be represented by the small circles 406, 408, and 410 in FIG. 4, and the values may be represented by the dots inside the circles 406, 408, and 410. It should be clear that FIG. 4 shows only 3 features and potential values, while this example would require six small circles and a different number of feature values. Here, the feature/value or key/value pairs are assumed to be uncorrelated.

The SNN can be trained using supervised learning with backpropagation to achieve a comparable high accuracy on unseen test data. Probabilistic or deterministic backpropagation over a two-layer network and the newly proposed encoding scheme are effective. The two networks have shown close to 88% and 97% prediction accuracy in experiments, respectively.

The same set of input data, features and labels may also be used in an embodiment for an SNN for unsupervised learning. In such a set-up, there are all-to-all lateral inhibitory connections within the output layer. The learning is performed by a winner-take-all spike network with spike-timing-dependent plasticity (STDP).

Furthermore, the encoding a key/value pair for a given key and value is achieved by mapping the key/value pair to a spike pattern (of a subset of input neurons of spiking neural network associated with the key). Each key k that appears in a dataset is assigned Lk input-layer neurons of spiking neural network, where Lk is the number of possible values that key can have. Each key/value pair is mapped to one sequence of spikes over T (e.g., measured in ms), where the input neuron corresponding to the value is associated with a pseudo-random Poisson spike train with a given mean firing rate, while the other Lk−1 do not generate spikes. Spikes of a pattern occur at pseudo-randomly generated time instants. The mapping is fixed and is used for creating input patterns for the spiking neural network.

Finally, the correlation of the pseudo-randomly generated spike patterns for two key/value pairs results in a correlation value that may correspond to a similarity value between the elements that exhibit the key/value pairs.

Figure 6:
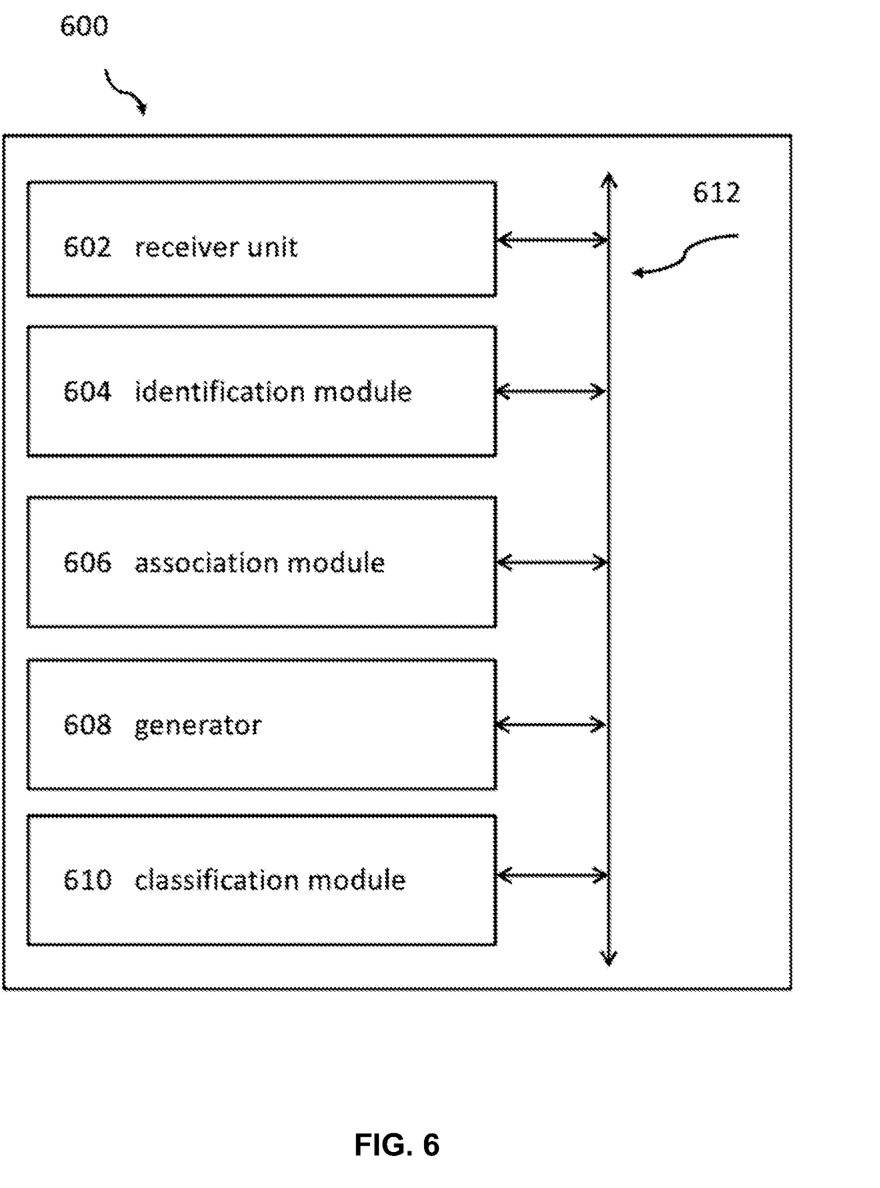
FIG. 6 shows a block diagram of a spiking neural network for a classification of an input element to an output class in the spiking neural network, in accordance with one embodiment of the present invention.

For completeness reasons, FIG. 6 shows a block diagram (in an abstract form) of the spiking neural network 600 for a classification of an input element to an output class in the spiking neural network 600. The spiking neural network 600 comprises receiving means, in particular a receiver unit 602, for receiving an input data set comprising a plurality of elements; identification means, in particular an identification module 604, for identifying a set of features and corresponding feature values for each element of the input data set; and association means, in particular an association module 606, for associating each feature to a subset of spiking neurons of a set of input spiking neurons of the spiking neural network.

Additionally, the spiking neural network 600 comprises generator means, in particular the generators 608, for generating, by the input spiking neurons, spikes at pseudo-random time instants depending on a value of the feature for a given input element; and classification means, in particular the classification module 610, for classifying an element into a class depending on a distance measure value between output spiking patterns at output spiking neurons of the spiking neural network and a predefined target pattern related to the class. It may be noted that the formulation "aaa" means for "bbb" may have the structure "aaa" means adapted for "bbb".

It may also be noted that the receiver unit 602, the identification module 604, the association module 606, the generators 608, and the classification module 610 are typically and selectively electrically connected in a 1:1 or n:m form, and they are alternatively connected to the spiking neural network internal system bus 612.

Embodiments of the invention may be implemented together with virtually any type of computer, regardless of the platform being suitable for storing and/or executing program code. As an example, FIG. 7 shows a computing system 700 suitable for executing program code related to the proposed method.

The computing system 700 is only one example of a suitable computer system, and is not intended to suggest any limitation as to the scope of use or functionality of embodiments of the invention described herein, regardless whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

Figure 7:
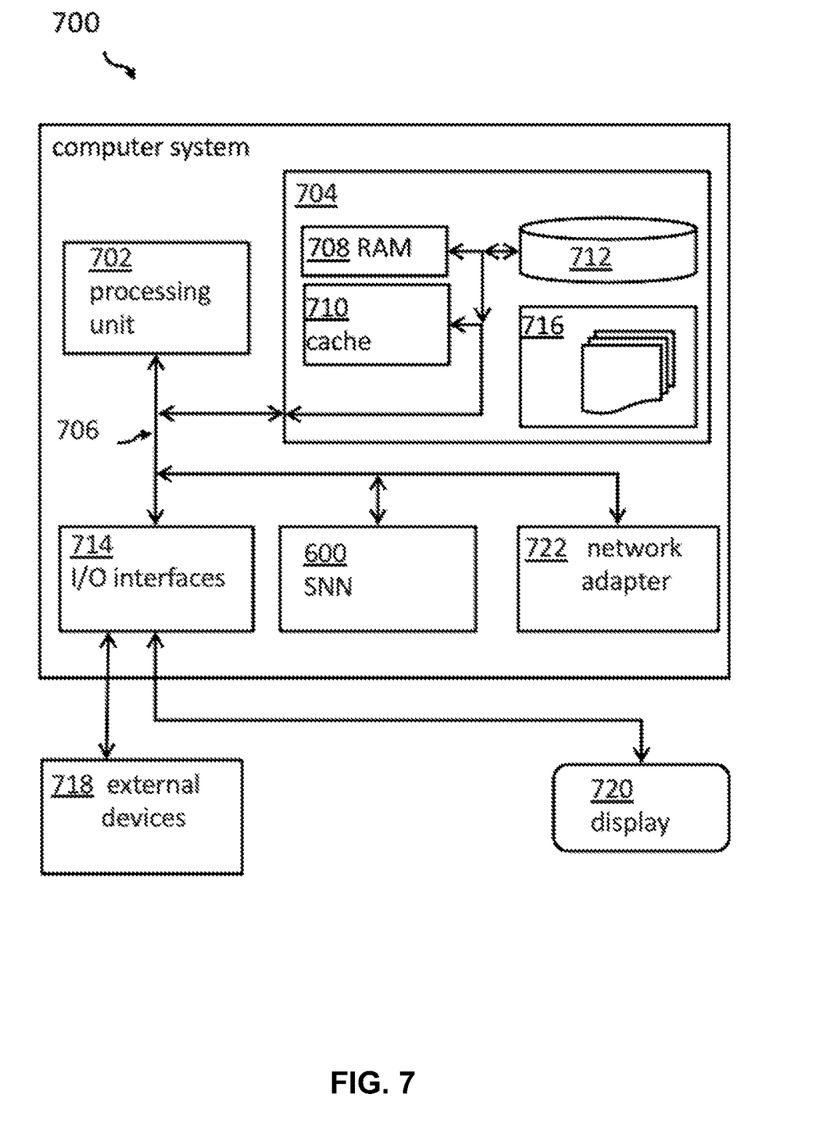
FIG. 7 shows a computing system comprising a spiking neural network, in accordance with one embodiment of the present invention.

As shown FIG. 7, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a floppy disk), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples include but are not limited to: microcode, device drivers, redundant processing units, external disk drive arrays, RAID systems, tape drives, and data archival storage systems, etc.

Additionally, spiking neural network 600 for a classification of an input element to an output class in the spiking neural network can be attached to the bus system 706.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for a classification of an input element to an output class in a spiking neural network, the method comprising:
    receiving an input data set comprising a plurality of elements;
    identifying a set of features and corresponding feature values for each element of the input data set;
    associating each feature to a subset of spiking neurons of a set of input spiking neurons of the spiking neural network;
    generating, by the input spiking neurons, spikes at pseudo-random time instants depending on a value of a feature for a given input element; and
    classifying an element into a class depending on a distance measure value between output spiking patterns at output spiking neurons of the spiking neural network and a predefined target pattern related to the class.

2. The computer-implemented method of claim 1, wherein a type of the feature is selected out of a group comprising at least a categorical type, an ordinal type, and a numerical type.

3. The computer-implemented method of claim 1, wherein the spiking neural network comprises a hidden layer of spiking neurons connected between an input layer and an output layer of the spiking neural network.

4. The computer-implemented method of claim 3, further comprising:
    performing training of the spiking neural network by a backpropagation of an error signal through time, wherein the error signal is obtained by comparing a generated spike pattern at an output of the output spiking neurons with a predefined target output pattern relating to the class of the element.

5. The computer-implemented method of claim 1, wherein the spiking neural network comprises an input layer of spiking neurons connected to an output layer.

6. The computer-implemented method of claim 5, wherein the associating each feature to the subset of the spiking neurons comprises:
    associating one feature/value pair to one neuron of the subset of the spiking neurons.

7. The computer-implemented method of claim 6, further comprising:
    connecting spiking neurons of the output layer with all-to-all inhibitory connections.

8. The computer-implemented method of claim 7, further comprising:
    categorizing classes of the elements by relating a class with one class-labelled element.

9. The computer-implemented method of claim 4, further comprising:
    performing training of the spiking neural network by a winner-take-all approach.

10. The computer-implemented method of claim 1, wherein a correlation between pseudo-random input spike patterns corresponds to a similarity value between the elements of the input data set.

11. A spiking neural network for a classification of an input element to an output class in the spiking neural network, the spiking neural network comprising:
    a receiving means for receiving an input data set comprising a plurality of elements;
    an identification means for identifying a set of features and corresponding feature values for each element of the input data set;

an association means for associating each feature to a subset of spiking neurons of a set of input spiking neurons of the spiking neural network;

a generator means for generating, by the input spiking neurons, spikes at pseudo-random time instants depending on a value of a feature for a given input element; and a classification means for classifying an element into a class depending on a distance measure value between output spiking patterns at output spiking neurons of the spiking neural network and a predefined target pattern related to the class.

12. The spiking neural network of claim 11, wherein a type of the feature is selected out of a group comprising at least a categorical type, an ordinal type, and a numerical type.

13. The spiking neural network of claim 11, wherein the spiking neural network comprises a hidden layer of spiking neurons connected between an input layer and an output layer of the spiking neural network.

14. The spiking neural network of claim 13, further comprising:

a training means for performing training of the spiking neural network by a backpropagation of an error signal through time, wherein the error signal is obtained by comparing a generated spike pattern at an output of the output spiking neurons with a predefined target output pattern relating to the class of the element.

15. The spiking neural network of claim 11, wherein the spiking neural network comprises an input layer of spiking neurons connected to an output layer.

16. The spiking neural network of claim 15, wherein the association means is further adapted for associating one feature/value pair to one neuron of the subset of the spiking neurons.

17. The spiking neural network of claim 16, wherein spiking neurons of the output layer are connected with all-to-all inhibitory connections.

18. The spiking neural network of claim 17, further comprising a categorization means for categorizing classes of the elements by relating a class with one class-labelled element.

19. The spiking neural network of claim 14, wherein the training means is further adapted for performing training of the spiking neural network by a winner-take-all approach.

20. A computer program product for a spiking neural network for a classification of an input element to an output class in the spiking neural network, the computer program product comprising a computer readable storage medium having program instructions embodied therewith, the program instructions being executable by one or more computing systems or controllers to cause the one or more computing systems to:

receive an input data set comprising a plurality of elements;

identify a set of features and corresponding feature values for each element of the input data set;

associate each feature to a subset of spiking neurons of a set of input spiking neurons of the spiking neural network;

generate, by the input spiking neurons, spikes at pseudo-random time instants depending on a value of a feature for a given input element; and classify an element into a class depending on a distance measure value between output spiking patterns at output spiking neurons of the spiking neural network and a predefined target pattern related to the class.

* * * * *